United States Patent [19]
Lamoureux

[11] Patent Number: 5,267,275
[45] Date of Patent: Nov. 30, 1993

[54] APPARATUS FOR SEALING A JOINT

[75] Inventor: Edward F. Lamoureux, Hampden, Mass.

[73] Assignee: Combustion Engineering, Inc., Windsor, Conn.

[21] Appl. No.: 679,454

[22] Filed: Apr. 2, 1991

[51] Int. Cl.$^5$ .............................................. G21C 13/00
[52] U.S. Cl. .................................... 376/203; 277/1
[58] Field of Search ............... 376/204, 203, 292, 260; 285/185; 277/1, 4

[56] References Cited

U.S. PATENT DOCUMENTS

| | | | |
|---|---|---|---|
| 4,157,833 | 6/1979 | Kozlowski | 277/1 |
| 4,826,217 | 5/1989 | Guerrero | 285/158 |

Primary Examiner—Donald P. Walsh
Assistant Examiner—Frederick H. Voss
Attorney, Agent, or Firm—John H. Mulholland

[57] ABSTRACT

Apparatus for sealing a joint between an inclined base surface having a leak path and a mating end surface of a hollow body surrounding the leak path. Compression gasket means receive an asymmetric preload force applied through the hollow body from an environmental pressure preloading element having a variable spring constant in register with the joint. The preloading element is a ring-shaped body of a given thickness of an asymmetric radial structure defined by a plurality of unlike radially inwardly directed through slots open to its periphery and axially stacked.

8 Claims, 2 Drawing Sheets

APPARATUS FOR SEALING A JOINT

BACKGROUND OF THE INVENTION

The present invention is directed to the establishment of a leak tight or leak limiting joint between a base surface and a mating end surface of a hollow body. More particularly, the invention involves establishing effective seals on inclined and/or non-planar surfaces where a non-uniform or asymmetric preload force is applied to a compression gasket. Typical of the use of such a joint would be in connection with nuclear steam supply systems for power generation.

In boiling water nuclear reactors, control rods are driven upwardly through "nozzles" disposed in the lower portion of the reactor pressure vessel. The nozzles are supported by and are longer than "stub tubes" which are welded to the interior wall of the reactor vessel. Each nozzle is sealed to its associated stub tube by means of an annular weld between the nozzle and the stub tube upper end.

As fully described and illustrated in U.S. Pat. No. 4,826,217, leaks or leak paths may develop during the operation of a boiling water reactor. The apparatus for sealing the leaks illustrated in that patent includes an outer housing or hollow body which surrounds the stub tube/nozzle tube assembly and is generally coaxial therewith. A lower gasket means in the form of a packing ring is disposed between the hollow body at its end which mates with the reactor vessel and the vessel wall, which can be termed a base surface. The hollow body surrounds the leak or leak path to be sealed and the gasket means has a preload force applied by torquing a sealing nut against a spring washer at the top of the housing until sufficient pressure is provided to insure a good seal under vessel low pressure conditions. Reactor internal pressure generates a downward, i.e., a seating force on the lower gasket means, through the hollow body during reactor operation.

Because the base surface is an inclined and/or a non-planar surface, an asymmetrical loading results from the action of the reactor coolant on the sleeve housing and the housing or hollow body has a tendency to slide upwardly along the inclined vessel wall or base surface. Such sliding movement could result in the loss of sealing at the joint between the base surface and the mating end surface of the hollow body.

SUMMARY OF THE INVENTION

The present invention overcomes the above-discussed and other deficiencies of the prior art by providing an improved apparatus for effectively sealing a gasketed joint between a base surface and a mating end surface of a hollow body sealing device such as the outer housing of an apparatus for sealing leaks or leak paths between a reactor vessel cavity having an inclined or non-planar surface and the interior of a stub tube/nozzle tube assembly.

The gasketed joint is effectively sealed by means of an asymmetric preloading force creating means in the form of a ring-shape which applies the created force to the hollow body end opposite said seal in an effective force loading pattern substantially in register with said gasket means. The ring-shaped asymmetric preloading force creating means has a radial structure such that the effective force loading pattern creates an asymmetric preload force on said gasket means. The radial structure is created by slots cut transversely to the direction of the preloading force and open to the periphery of the ring-shaped means to render some areas in register with the gasket means of a different spring constant than other such areas.

The leak path to be sealed typically is between a reactor cavity having an inclined or non-planar surface and the interior of a stub tube/nozzle tube assembly and is surrounded by the hollow body. The base surface typically is inclined and the hollow body has a vertical axis. The base surface may also be of a non-planar shape such as is defined by a concave spherical surface portion of the inside of a reactor vessel bottom.

DETAILED DESCRIPTION OF THE ILLUSTRATED EMBODIMENT

Figure 1:
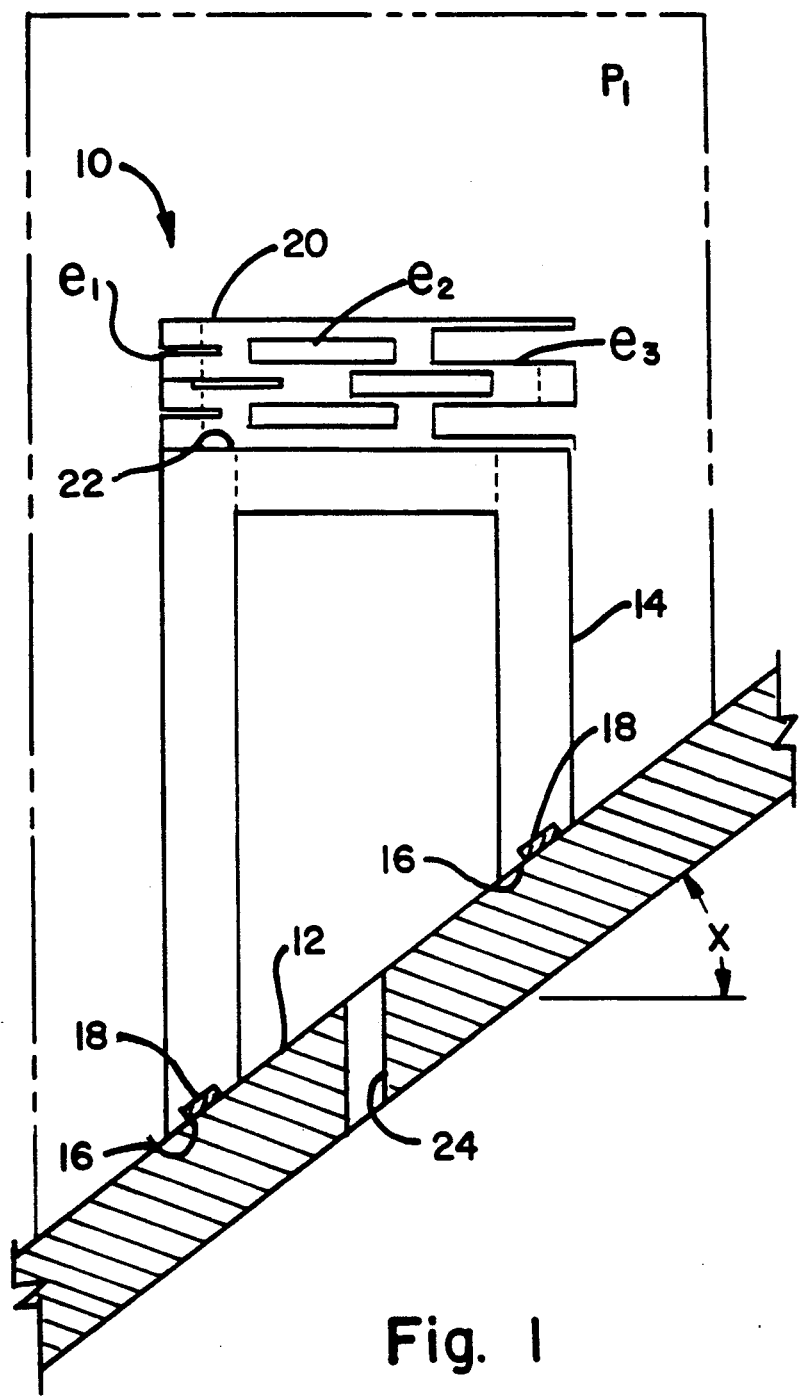
FIG. 1 is a schematic elevational view showing a hollow body having a mating end surface with compression gasket means to define a leak tight or leak-limiting joint with an inclined base surface having a leak path to be sealed with an asymmetric preload force creating ring-shaped preloading element at the upper end of the hollow body.

The numeral 10 generally designates an apparatus for sealing a joint between a base surface 12 and a sealing device or hollow body 14 having mating end surface 16 with a packing ring or compression gasket means 18. The apparatus 10 is located in a positive pressure environment $P_1$ such as a boiling water nuclear reactor vessel, and includes a preloading force element 20 for use in response to pressure $P_1$ against the end 22 of the hollow body 14 opposite its mating end surface 16 and packing ring 18.

The apparatus 10 provides a means for establishing, through use of the single element 20, a variable spring preload over the joint area around a leak path 24 to be sealed which will maintain the gasket means 18 under a compressive load sufficient to establish a leak tight or leak limiting joint.

As fully taught in U.S. Pat. No. 4,826,217, establishing seals on inclined and/or non-planar surfaces in the bottom of a boiling water nuclear reactor may require a non-uniform or non-symmetric preloading of the sealing gasket 18 over the base surface 12. In FIG. 1, for example, the base surface 12, which is the inside of a boiling water reactor vessel bottom, and the mating end surface 16 are both inclined at an angle (x) to the preload force direction (vertical) for sealing by means of a face seal compression gasket 18. If the application prohibits positive guiding of the hollow body or sealing device 14, it will be necessary to exert a greater percentage of the preload on the downhill side. This is required to limit tendency of the hollow body 14 from slipping downhill and to resist a pressure force (resulting from different uphill and downhill surface areas) that will rotate the sealing device toward the uphill side.

The asymmetric preloading force element 20 is a ring of substantial axial depth into which a plurality of circumferentially directed and radially directed through wall slots $e_1$ to $e_3$ of varying heights, lengths or angles are machined. The slots can be formed in a stacked pattern and spaced in any variable pattern to achieve an element with the required preload as a function of location. Designing the preloading force element 20 is performed by modeling the element using curved beams loaded normal to the plane of curvature which represents springs in series and series-parallel combinations. By adjusting the size of slots $e_1$ to $e_3$ and properly spacing them geometrically and circumferentially, an asymmetric preloading force on the end of hollow body 14 can be obtained in register and alignment with gasket 18.

Figure 2:
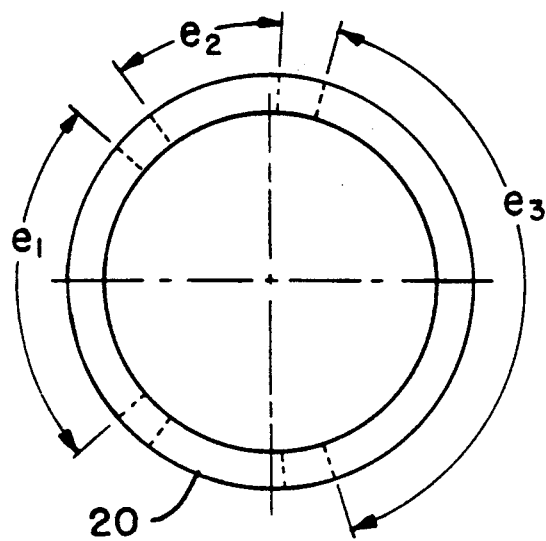
FIG. 2 is a schematic plan view of the asymmetric preload force creating ring-shaped preloading element of the apparatus of FIG. 1.
Figure 3:
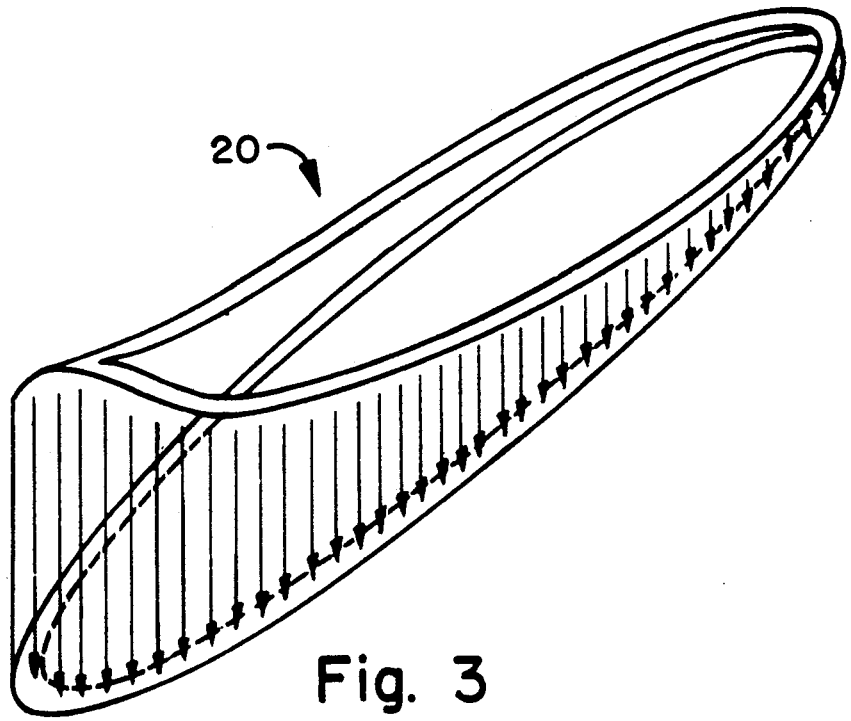
FIG. 3 is a schematic force loading diagram showing a typical force application to the joint by the apparatus of FIGS. 1 and 2.

FIG. 3 shows what a typical force schematic drawing showing relative preload force vectors for the apparatus 10 with a spring constant varying from a high to a low value around the circumference of the preloading force element 20, showing the relative asymmetric preloading on the inclined surfaces 12 and 16, and gasket means 18. The left side of FIG. 3 corresponds to the left side of FIGS. 1 and 2.

The asymmetric preloading force element 20 of the invention offers several advantages over devices of the prior art such as Belleville washers or springs. Its main advantage is that it offers more flexibility of design in establishing varying spring rates as a function of circumferential location. It also has an improved reliability in that a majority of the intended design preload can be maintained even with through wall failure of a single (or small number of) the slotted elements.

I claim:

1. Apparatus for sealing a joint between a base surface and a mating end surface of a hollow body, said base surface and mating end surface joint having a compression gasket means therebetween, which gasket means requires the application of a compression preload force applied through said hollow body to create an effective seal, said apparatus being characterized by:

means for creating an asymmetric preload force;
said means for creating an asymmetric preload force having a ring-shape with circumferentially directed and radially directed slots and which applies the created forced to the hollow body end opposite said seal in an effective force loading pattern substantially in register with said gasket means.

2. The apparatus of claim 1 in which the ring-shaped means for creating an asymmetric preload force has a radial structure such that the effective force loading pattern creates an asymmetric preload force on said gasket means.

3. The apparatus of claim 2 in which the ring-shaped means for creating an asymmetric preload force radial structure is created by slots open to the periphery thereof.

4. The apparatus of claim 3 in which the ring-shaped means for creating an asymmetric force is a body of a given thickness with slots cut in the body transversely to the direction of preloading force to render some areas in register with the gasket means of a different spring constant than other such areas.

5. The apparatus of claim 4 in which the joint surrounds a leak path to be sealed and said leak path is between a reactor vessel cavity having an inclined or non-planar surface and the interior of a stub tube/nozzle tube assembly.

6. The apparatus of claim 1 in which the base surface is inclined and said hollow body has a vertical axis.

7. The apparatus of claim 1 in which the base surface is non-planar.

8. A preloading force element for use with a hollow body comprising:
a ring of substantial axial depth having an asymmetric radial structure defined by a plurality of radially inwardly and circumferentially directed through slots.

* * * * *